United States Patent
Zhang et al.

(10) Patent No.: US 11,742,656 B2
(45) Date of Patent: Aug. 29, 2023

(54) SURGE PROTECTION DEVICE WITH HIGH BREAKING CAPACITY

(71) Applicant: XIAMEN SET ELECTRONICS CO., LTD., Xiamen (CN)

(72) Inventors: Xianggui Zhang, Xiamen (CN); Tian'an Gao, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 58 days.

(21) Appl. No.: 17/623,856

(22) PCT Filed: Jul. 6, 2020

(86) PCT No.: PCT/CN2020/100457
§ 371 (c)(1),
(2) Date: Dec. 29, 2021

(87) PCT Pub. No.: WO2021/057163
PCT Pub. Date: Apr. 1, 2021

(65) Prior Publication Data
US 2022/0360071 A1 Nov. 10, 2022

(30) Foreign Application Priority Data
Sep. 29, 2019 (CN) .......................... 201910932326.0

(51) Int. Cl.
*H02H 9/04* (2006.01)
*H02H 5/04* (2006.01)

(52) U.S. Cl.
CPC .............. *H02H 9/04* (2013.01); *H02H 5/047* (2013.01)

(58) Field of Classification Search
CPC .......... H02H 9/04; H02H 5/047; H02H 7/008; H02H 9/02; H02H 9/043; H01H 37/765; H01H 37/76; H01C 7/126; H01T 1/14
(Continued)

(56) References Cited

U.S. PATENT DOCUMENTS

| | | | |
|---|---|---|---|
| 5,321,574 A | | 6/1994 | Patrick et al. |
| 6,040,971 A | * | 3/2000 | Martenson ............... H01C 7/12 361/103 |

(Continued)

FOREIGN PATENT DOCUMENTS

| | | |
|---|---|---|
| CN | 101692393 A | 4/2010 |
| CN | 107424881 A | 12/2017 |

(Continued)

*Primary Examiner* — Dharti H Patel
(74) *Attorney, Agent, or Firm* — Bayramoglu Law Offices LLC

(57) ABSTRACT

A surge protection device with a high breaking capacity includes a housing with at least two lead-out electrodes, and a voltage limiting device and a thermal tripping mechanism that are installed in the housing. The voltage limiting device includes a voltage limiter, a first electrode and a second electrode that are positioned and installed in an insulating cover. The thermal tripping mechanism includes a fixed assembly, a movable assembly and a thermal trigger device. The fixed assembly and the movable assembly form a plurality of displacement switches arranged in series. The thermal trigger device is disposed in linkage with the movable assembly and includes a metal trigger sheet, a fusible alloy and an energy storage member. One end of the metal trigger sheet is fixed on the movable assembly, and the other end of the metal trigger sheet is fixed on the second electrode through welding by the fusible alloy.

13 Claims, 13 Drawing Sheets

(58) Field of Classification Search
USPC .......................................................... 361/118
See application file for complete search history.

(56) References Cited

U.S. PATENT DOCUMENTS

| | | | |
|---|---|---|---|
| 9,172,236 B2* | 10/2015 | Hirschmann | H01C 7/12 |
| 9,837,236 B2* | 12/2017 | Hong | H01H 37/761 |
| 2014/0313632 A1* | 10/2014 | Hirschmann | H01C 7/126 |
| | | | 361/131 |
| 2016/0204599 A1* | 7/2016 | Strangfeld | H02H 3/205 |
| | | | 361/91.2 |
| 2017/0110226 A1* | 4/2017 | Hirschmann | H01T 1/14 |
| 2020/0335964 A1* | 10/2020 | Zhang | H01C 7/108 |

FOREIGN PATENT DOCUMENTS

| | | |
|---|---|---|
| CN | 107516885 A | 12/2017 |
| CN | 209434871 U | 9/2019 |
| CN | 110492463 A | 11/2019 |
| CN | 210490462 U | 5/2020 |

* cited by examiner

SURGE PROTECTION DEVICE WITH HIGH BREAKING CAPACITY

CROSS REFERENCE TO THE RELATED APPLICATIONS

This application is the national phase entry of International Application No. PCT/CN2020/100457, filed on Jul. 6, 2020, which is based upon and claims priority to Chinese Patent Application No. 201910932326.0, filed on Sep. 29, 2019, the entire contents of which are incorporated herein by reference.

TECHNICAL FIELD

The present invention relates to the technical field of overvoltage protection, and more particularly, to a surge protection device with a high breaking capacity.

BACKGROUND

A surge protection device is an overvoltage protection device connected to an electronic device or a low-voltage distribution system. The surge protection device is mainly used to discharge a surge current caused by a lightning current, lightning induction, or a switching operation, and limit an amplitude of an overvoltage, to prevent the surge current from damaging other devices in a circuit.

In order to improve an overvoltage limiting capacity, a voltage limiting surge protector usually needs to be configured at a front end of a distribution board or device. The voltage limiting surge protector has the following two prominent problems:

1. Failures of key components of the voltage limiting surge protector, such as a voltage-dependent resistor and a transient voltage suppressor, are usually caused by short circuits due to a thermal breakdown in most cases. Therefore, it is necessary to improve a thermal protection function. However, a thermal protection device usually does not have an overcurrent protection function, and can only cut off tens of amps of alternating currents (ACs) or a few amps of direct currents (DCs). If a voltage limiting device is short-circuited but the thermal protection device is not started, hundreds or thousands of amps of short-circuit currents are caused. In this case that the surge protector itself cannot cut off the fault current, an external overcurrent protection device is required to cut off the fault current, otherwise there will be a fire hazard. However, the external overcurrent protection device used to protect the surge protector still have some recognized problems to be resolved in the industry, such as a poor surge current bearing capacity, difficult coordination of overcurrent protection starting current, a high residual voltage, and a high cost.

2. The thermal protection device of the voltage limiting surge protector adopts an alloy with a low melting point as a thermal trigger medium, and is connected to the voltage limiting device in series to form an electrical connection path. A melting point temperature from 100° C. to 160° C. is usually selected for the thermal trigger medium. The thermal protection device is prone to trip by mistake or in advance when the surge current flows through the thermal protection device. This is caused by an interaction effect of heating of the voltage limiting device when the surge current flows through the voltage limiting device, the low melting point of the thermal trigger medium, a thermal effect, and an electrodynamic effect when the surge current flows through the thermal trigger medium, and a brittle material of the thermal trigger medium.

To avoid the adverse effects of the above two conditions on the surge protector, the present invention provides a surge protector with a high breaking capacity.

SUMMARY

The present invention is intended to provide a surge protection device with a high breaking capacity, to resolve problems that a thermal protection device of an existing surge protection device does not have an overcurrent protection function and the thermal protection device is easy to trip by mistake or in advance when a surge current flows through the thermal protection device.

The present invention adopts the following specific technical solutions:

A surge protection device with a high breaking capacity includes a housing with at least two lead-out electrodes, and a voltage limiting device and a thermal tripping mechanism that are installed in the housing, where the voltage limiting device includes a voltage limiter, a first electrode and a second electrode that are positioned and installed in an insulating cover;

the thermal tripping mechanism includes a fixed assembly, a movable assembly and a thermal trigger device, where the fixed assembly and the movable assembly form a plurality of displacement switches arranged in series, the thermal trigger device is disposed in linkage with the movable assembly, and includes a metal trigger sheet, a fusible alloy and an energy storage member, one end of the metal trigger sheet is fixed on the movable assembly, and the other end of the metal trigger sheet is fixed on the second electrode through welding by the fusible alloy, where a displacement of the movable assembly relative to the movable assembly is limited, and the energy storage member accumulates potential energy to displace the movable assembly relative to the fixed assembly; and the first electrode is electrically connected to one of the lead-out electrodes, and both ends of the plurality of displacement switches arranged in series are electrically connected to the second electrode and another lead-out electrode, respectively.

Further, the fixed assembly includes a fixed bracket and n fixed electrodes sequentially fixed on the fixed bracket, n≥2, and the fixed electrodes are disconnected from each other; the movable assembly includes a movable bracket and n+1 movable electrodes sequentially fixed on the movable bracket; a gap is formed between two adjacent movable electrodes; the movable bracket has a first state in which the movable bracket has no displacement relative to the fixed bracket and a second state in which the movable bracket has a displacement relative to the fixed bracket; in the first state, each fixed electrode is in contact with two adjacent movable electrodes corresponding to each fixed electrode to allow all the fixed electrodes to be in a conducting state; and in the second state, the gap formed between the two adjacent movable electrodes is exactly located at a position at which two adjacent fixed electrodes corresponding to the two adjacent movable electrodes are disconnected from each other, such that the fixed electrodes are disconnected from each other and in a non-conducting state.

Further, limit structures matched with each other are respectively disposed on the movable bracket and the fixed bracket, and the limit structures can limit a displacement distance or an angle of the movable bracket relative to the fixed bracket.

Further, the limit structures are a protrusion portion disposed on the movable bracket and an avoidance slot disposed on the fixed bracket.

Further, an interval between gaps is not less than 0.1 mm.

Further, the fixed bracket is provided with a roughly cylindrical cavity, and a center of the cavity is provided with a rotating shaft; the movable bracket is pivoted on the fixed bracket through the rotating shaft, and has an outer peripheral wall corresponding to an inner wall of the cavity; and the fixed electrodes are fixed on the inner wall of the cavity, and the movable electrodes are fixed on the outer peripheral wall of the movable bracket.

Further, the first electrode and the second electrode of the voltage limiting device are respectively provided with a first electrode lead-out portion and a second electrode lead-out portion that extend to the outside of the insulating cover; each of a first fixed electrode and an $n^{th}$ fixed electrode on the fixed assembly is provided with a fixed electrode lead-out portion; the first electrode lead-out portion is disposed tightly adjacent to one lead-out electrode, the second electrode lead-out portion is disposed tightly adjacent to one fixed electrode lead-out portion, and another fixed electrode lead-out portion is disposed tightly adjacent to another lead-out electrode.

Further, the surge protection device is provided with a current fuse connected in parallel to each of k gaps of n gaps connected in series, where k≤n.

Further, the movable electrodes on both sides of each even-numbered gap are connected to the current fuse in parallel.

Further, the movable bracket is provided with a plurality of fixing slots for placing the current fuse; and each fixing slot is connected to two opposite latching slots, and two pins of the current fuse fixed in the fixing slot are in conductive contact with fixed electrodes on both sides of a corresponding gap through the two latching slots.

Further, the surge protection device includes a remote signaling switch or a window in linkage with the movable assembly.

Compared with the prior art, the surge protection device with a high breaking capacity in the present invention has the following advantages: In the thermal tripping mechanism of the surge protection device provided in the present invention, the fusible alloy as a welding point of a thermal trigger medium is not connected to the circuit, so a thermal protection device does not trip by mistake or in advance when a surge current flows through the thermal protection device. Moreover, in a process of breaking an arc under a system voltage, a plurality of (≥2) gaps connected in series have a higher arc voltage drop than a single gap, which can limit an arc current. An enough number of the gaps can limit the current within a safe range. This not only avoids a risk of misoperation caused by a thermal effect and an electrodynamic effect when a lightning current passes through a thermal trigger medium of a thermal release device of a conventional surge protection device but also avoids the risk of a fire hazard caused by a large current due to a short circuit of the voltage limiting device.

The above description is merely a summary of the technical solutions of the present invention. To make the technical means of the present invention to be understood more clearly and implemented in accordance with the content of the specification, and in order to make the above and other objectives, features and advantages of the present invention more obvious and easier to understand, specific implementations of the present invention are described below.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF THE EMBODIMENTS

Figure 1:
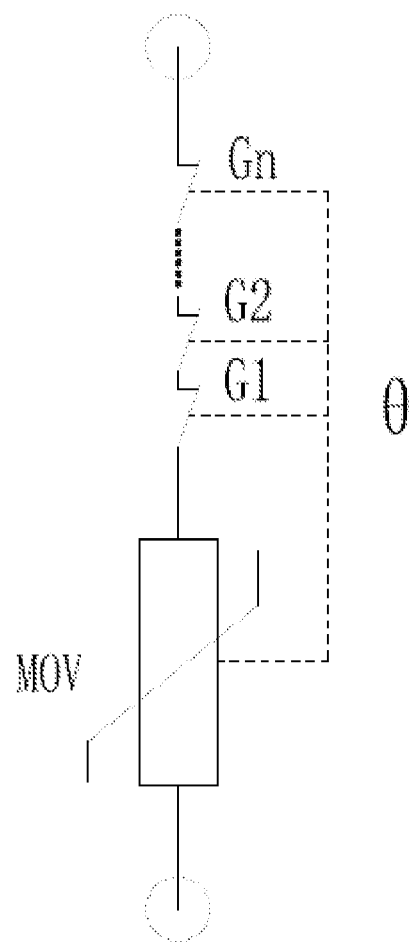
FIG. 1 schematically shows a circuit principle before thermal tripping of a surge protection device in Embodiment 1.

To further illustrate the embodiments, the present invention provides accompanying drawings. The accompanying drawings, as a part of the present invention, are mainly used to illustrate the embodiments, and can explain the operating principles of the embodiments with reference to the related descriptions in this specification. With reference to such content, those of ordinary skill in the art can understand other possible implementations and the advantages of the present invention. Components in the drawings are not drawn to scale, and similar reference numerals are usually used to represent similar components.

The present invention will be further described below with reference to the accompanying drawing and specific implementations.

Embodiment 1

Figure 2:
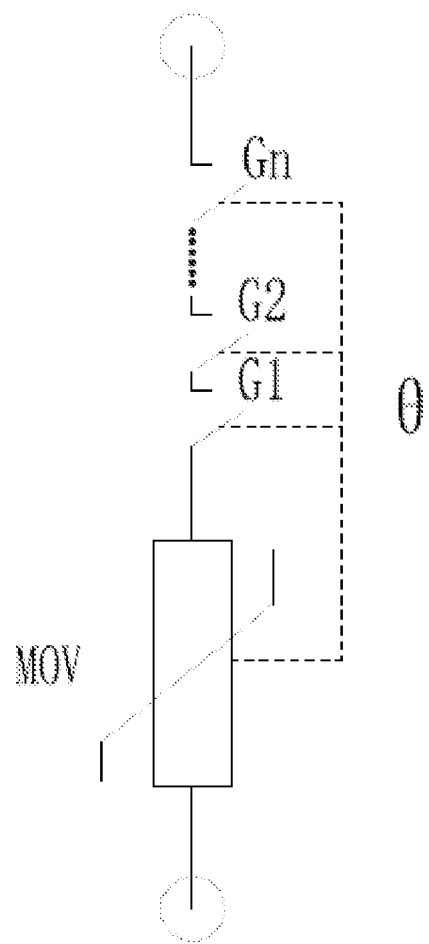
FIG. 2 schematically shows a circuit principle after thermal tripping of a surge protection device in Embodiment 2.
Figure 3:
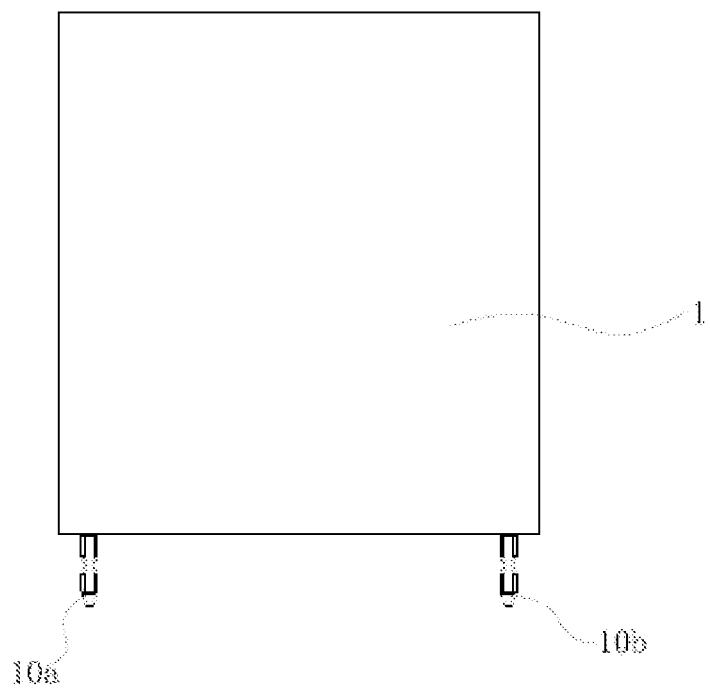
FIG. 3 schematically shows a front view of a surge protection device in Embodiment 1.
Figure 4:
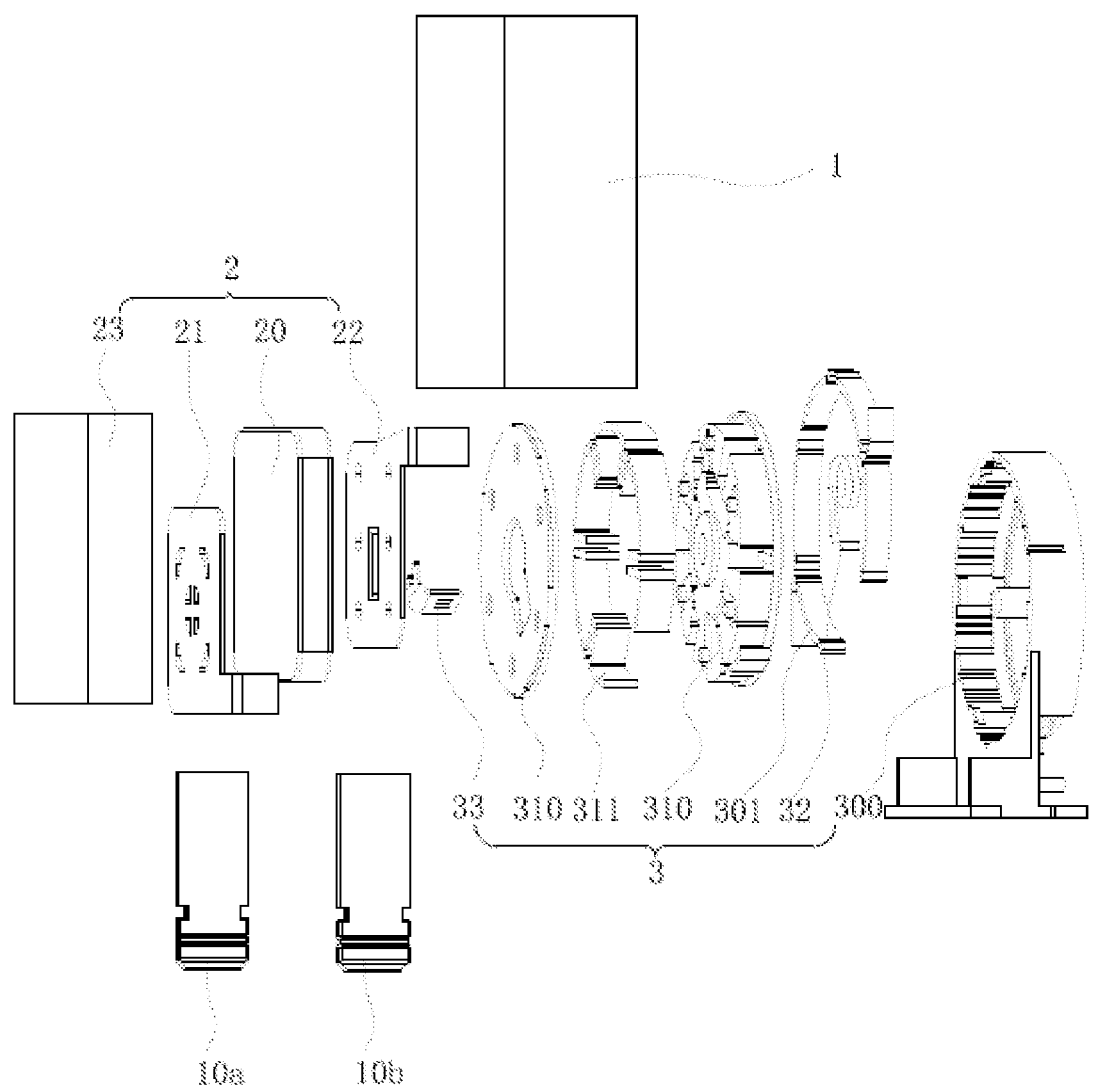
FIG. 4 schematically shows an explosive view of a surge protection device in Embodiment 1.
Figure 5:
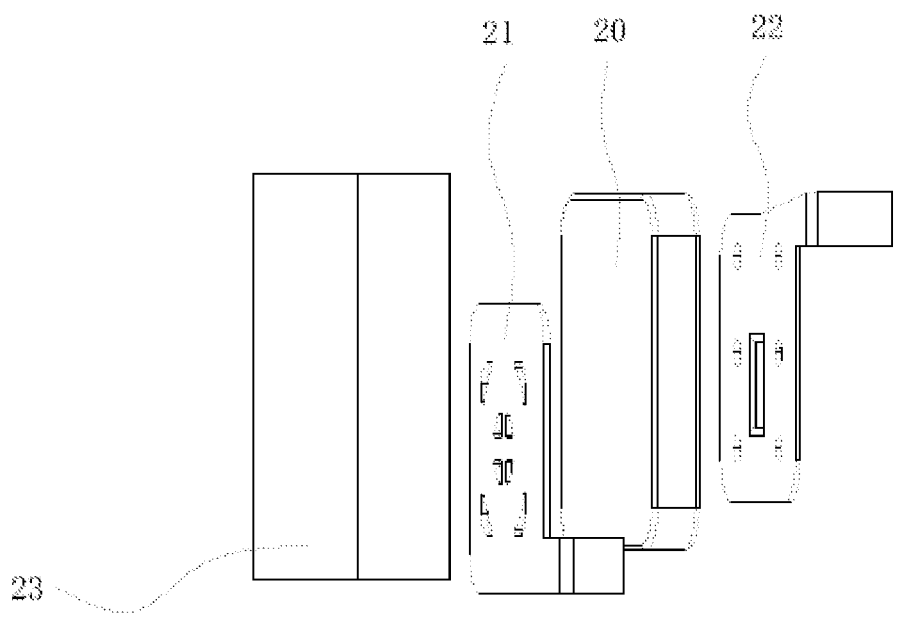
FIG. 5 schematically shows an explosive view of a voltage limiting device in Embodiment 1.
Figure 6:
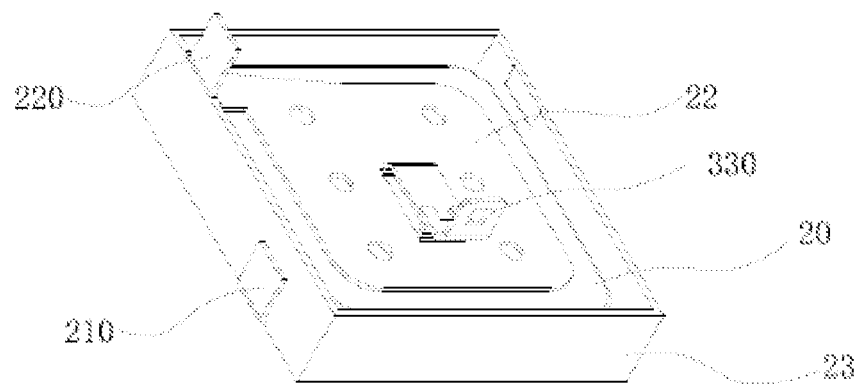
FIG. 6 schematically shows an assembly diagram of a voltage limiting device in Embodiment 1.
Figure 7:
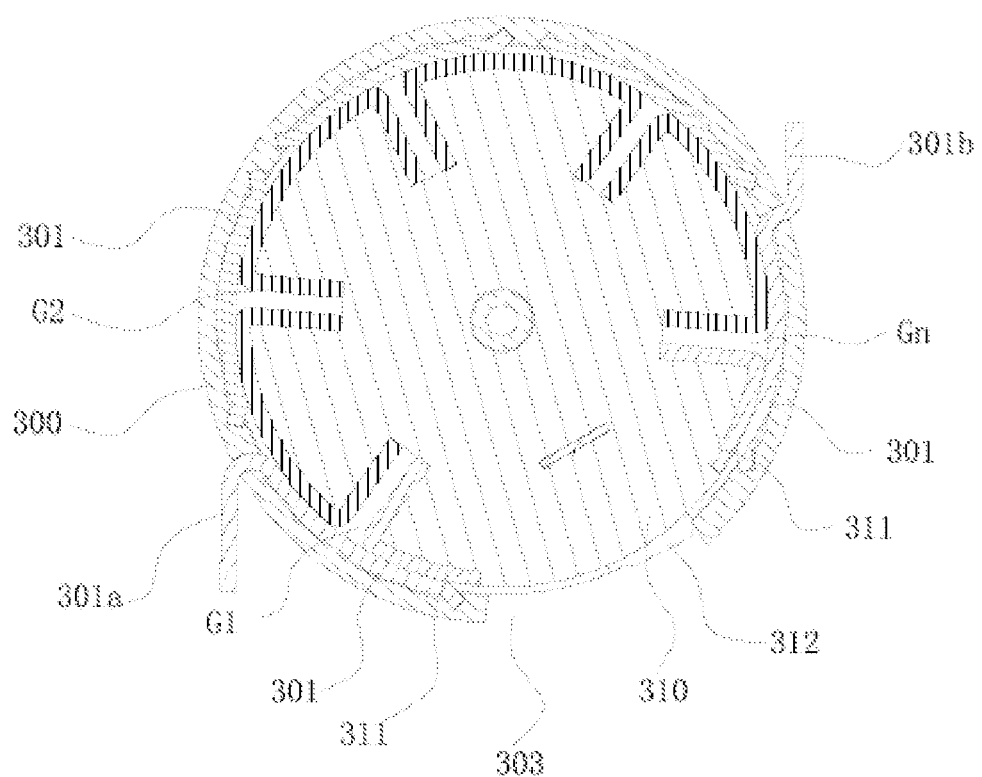
FIG. 7 is a schematic diagram before thermal tripping of a thermal tripping mechanism in Embodiment 1.
Figure 8:
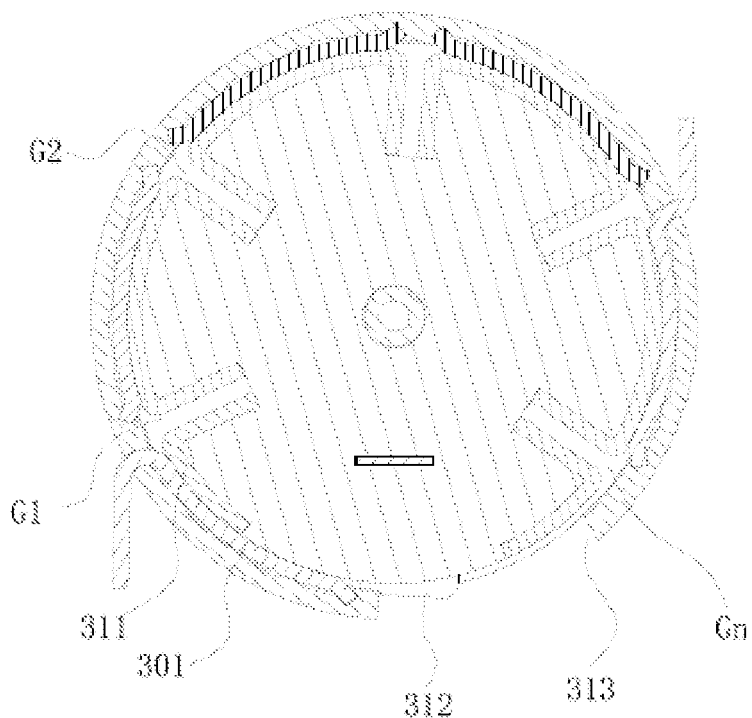
FIG. 8 is a schematic diagram after thermal tripping of a thermal tripping mechanism in Embodiment 1.
Figure 9:
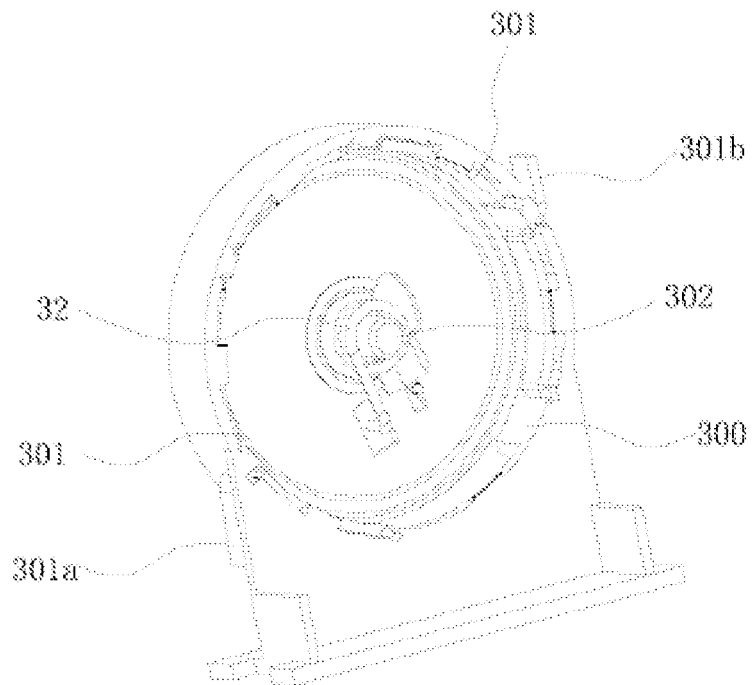
FIG. 9 is a schematic diagram of a fixed bracket in Embodiment 1.
Figure 10:
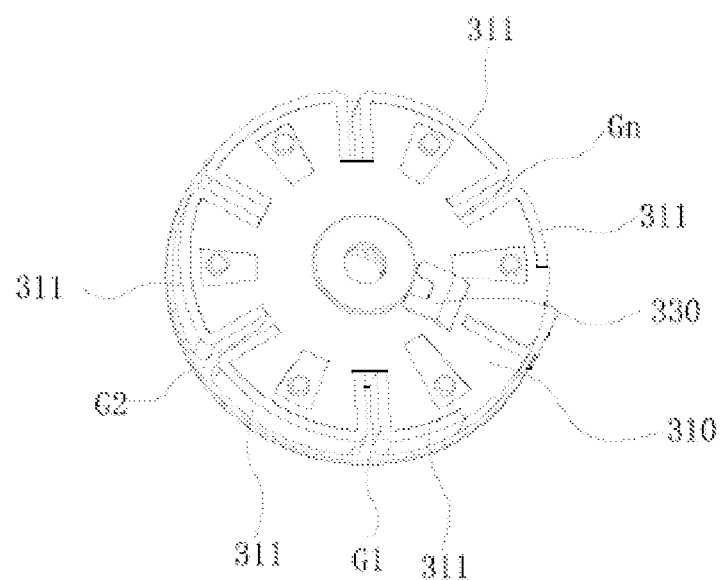
FIG. 10 is a schematic diagram of a movable bracket in Embodiment 1.
Figure 11:
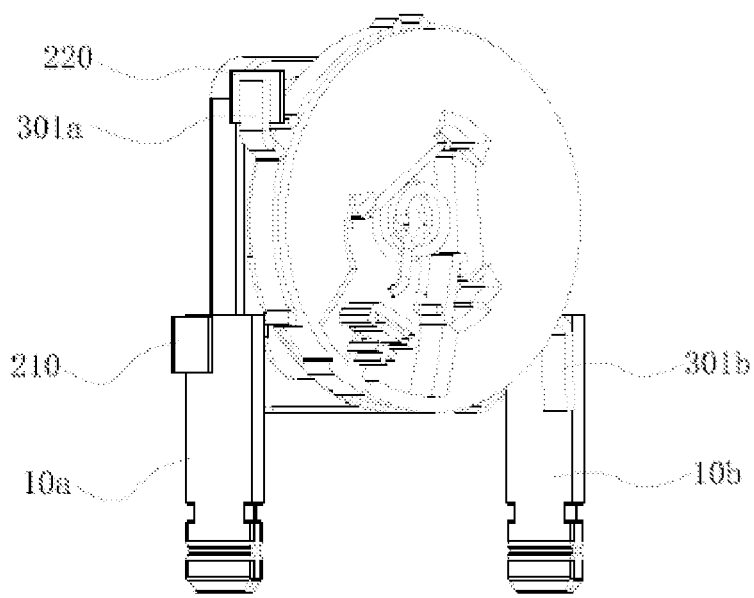
FIG. 11 schematically shows an assembly diagram of electrode pins in a surge protection device in Embodiment 1.
Figure 12:
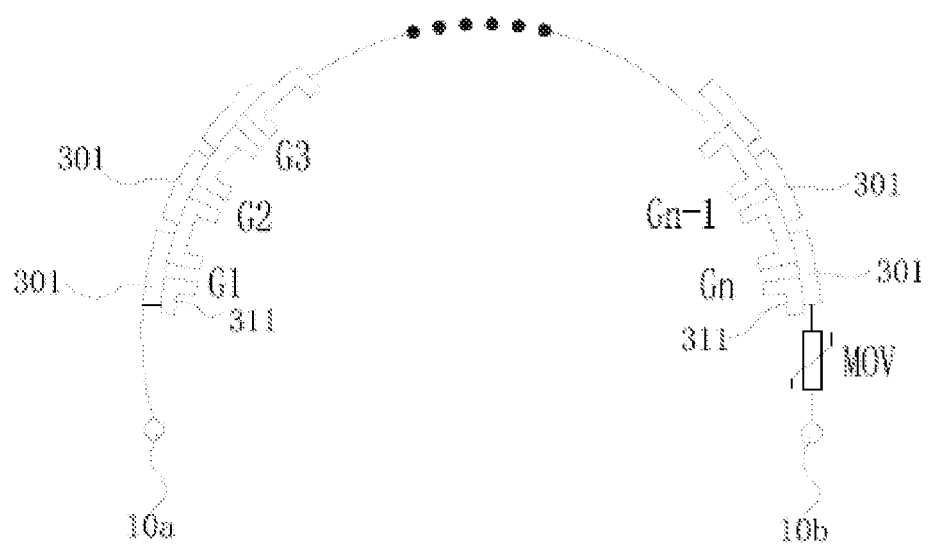
FIG. 12 schematically shows an assembly relationship between electrode pins in a surge protection device in Embodiment 1.

As shown in FIG. 1 to FIG. 10, this embodiment provides a surge protection device with a high breaking capacity. The surge protection device includes a housing 1 with at two lead-out electrodes 10a and 10b, and a voltage limiting device 2 and a thermal tripping mechanism 3 that are installed in the housing 1. Circuit principles of the surge protection device are shown in FIG. 1 and FIG. 2. FIG. 1 shows a circuit principle before thermal tripping. FIG. 2 shows a circuit principle after thermal tripping.

As shown in FIG. 3 to FIG. 6, the voltage limiting device 2 includes a voltage limiter 20, a first electrode 21, a second electrode 22, and an insulating cover 23. The voltage limiter 20 may be a voltage limiting element such as a voltage-dependent resistor or a transient voltage suppressor. In this embodiment, for example, the voltage limiting device 20 is a voltage-dependent resistor. Both ends of the voltage limiter 20 are connected to the first electrode 21 and the second electrode 22 respectively, and the voltage limiter 20, the first electrode 21, and the second electrode 22 are all installed in the insulating cover 23. A gap in the insulating cover 23 can also be filled with insulating colloids such as epoxy resin and silica gel.

As shown in FIG. 7 to FIG. 10, the thermal tripping mechanism 3 includes a fixed assembly 30, a movable assembly 31, an energy storage member 32, and a thermal trigger device 33. The fixed assembly 30 includes a fixed bracket 300 and n (n≥2) fixed electrodes 301 fixed on the fixed bracket 300, and the fixed electrodes 301 are disconnected from each other and in a non-conductive state.

The movable assembly 31 includes a movable bracket 310 and n+1 movable electrodes 311 fixed on the movable bracket 310. A gap (Gn) is formed between two adjacent movable electrodes 311, in other words, a gap (G1) is formed between a $1^{st}$ movable electrode 311 and a $2^{nd}$ movable electrode 311, a gap (G2) is formed between the $2^{nd}$ movable electrode 311 and a $3^{rd}$ movable electrode 311, and a gap (G3) is formed between the $3^{rd}$ movable electrode 311 and a $4^{th}$ movable electrode 311, . . . , and a gap (Gn) is formed between an $n^{th}$ movable electrode 311 and an $(n+1)^{th}$ movable electrode 311. Among the n+1 movable electrodes 311, a total of n gaps arranged in series are formed. In this embodiment, an interval between gaps (Gn) shall not be less than 0.1 mm to avoid arc restriking, and is preferably 0.6 mm to 1.5 mm, to avoid arc restriking and present too large space from being occupied.

The energy storage member 32 acts on the movable bracket 310, such that the movable bracket 310 can generate a relative displacement relative to the fixed bracket 300. In this way, the thermal tripping mechanism 3 has a first state in which the movable bracket 310 is not displaced relative to the fixed bracket 300 and a second state after a displacement.

When the movable bracket 310 and the fixed bracket 300 are in the first state, each fixed electrode 301 is in contact with two adjacent movable electrodes 311 corresponding to each fixed electrode 301 to allow all the fixed electrodes 301 to be in a conducting state. In other words, a first fixed electrode 301 is in contact with the $1^{st}$ movable electrode 311 and the $2^{nd}$ movable electrode 311, a $2^{nd}$ fixed electrode 301 is in contact with the $2^{nd}$ movable electrode 311 and the $3^{rd}$ movable electrode 311, a $3^{rd}$ fixed electrode 301 is in contact with the $3^{rd}$ movable electrode 311 and the $4^{th}$ movable electrode 311, . . . , and an $n^{th}$ fixed electrode 301 is in contact with the $n^{th}$ movable electrode 311 and the $(n+1)^{th}$ movable electrode 311.

When the movable bracket 310 and the fixed bracket 300 are in the second state, the gap formed between the two adjacent movable electrodes 311 is exactly located at a position at which two adjacent fixed electrodes 301 corresponding to the two adjacent movable electrodes are disconnected from each other, such that the fixed electrode 301 is only in contact with one movable electrode 311. In this way, the fixed electrodes 301 are disconnected from each other and in a non-conducting state. For example, the first fixed electrode 301 is only in contact with the $1^{st}$ movable electrode 311, the $2^{nd}$ fixed electrode 301 is only in contact with the $2^{nd}$ movable electrode 311, . . . , and the $n^{th}$ fixed electrode 301 is only in contact with the $n^{th}$ movable electrode 311. Alternatively, the first fixed electrode 301 is only in contact with the $2^{nd}$ movable electrode 311, the $2^{nd}$ fixed electrode 301 is only in contact with the $3^{rd}$ movable electrode 311, . . . , and the $n^{th}$ fixed electrode 301 is only in contact with the $(n+1)^{th}$ movable electrode 311.

The thermal trigger device 33 includes a metal trigger sheet 330. One end of the metal trigger sheet 330 is fixed on the fixed bracket 300, and the other end of the metal trigger sheet 330 is fixed on the second electrode 22 of the voltage limiting device 2 through welding through a fusible alloy. The fusible alloy mentioned herein usually refers to metal with a melting point below 300° C. and its alloy. For example, the fusible alloy is composed of low-melting point metal elements such as Bi, Sn, Pb, and In. When these metal elements are combined in different proportions, alloys with different melting points (binary, ternary or quaternary alloys) can be obtained. The metal trigger sheet 330 may be made of brass, bronze, white copper, or other materials. In addition, the metal trigger sheet 330 and the second electrode 22 are directly fixed through welding, which is more conducive to transferring heat of the voltage limiting device 2 to a welding point, so as to melt the fusible alloy and realize tripping, thereby realizing more timely thermal tripping of the metal trigger sheet 330.

When the metal trigger sheet 330 and the second electrode 22 of the voltage limiting device 2 are fixed through welding, the movable bracket 310 is not displaced relative to the fixed bracket 300, and the thermal tripping mechanism 3 is in the first state. In this case, the thermal tripping mechanism 3 is in the conducting state. When the heat generated by the voltage limiting device 2 is greater than a specified value, the welding point of the fusible alloy for fixing the metal trigger sheet 330 and the second electrode 22 is melted. Under the acting force of the energy storage member 32, the movable bracket 310 is displaced relative to the fixed bracket 300, the gap is effectively disconnected, and a main circuit is disconnected, thereby protecting against thermal tripping.

In the surge protection device with a high breaking capacity in this embodiment, the fusible alloy as a welding point of a thermal trigger medium in thermal tripping is not connected to a circuit, so a thermal protection device does not trip by mistake or in advance when a surge current flows through the thermal protection device. Moreover, in a process of breaking an arc under a system voltage, a plurality of (≥2) gaps connected in series have a higher arc voltage drop than a single gap, which can limit an arc current. An enough number of the gaps can limit the current within a safe range. This avoids a risk of misoperation caused by a thermal effect and an electrodynamic effect when a lightning current passes through a thermal trigger medium of a thermal release device of a conventional surge protection device.

The fixed assembly 30 and the movable assembly 31 may adopt a solution in which the movable assembly 31 rotates relative to the fixed assembly 30 to realize the displacement, as shown in the figure, but are not limited thereto. A solution in which the movable assembly 31 moves linearly relative to the fixed assembly 30 to realize the displacement may be adopted. In the solution in which the displacement is generated through rotation, the energy storage member 32 is a torsional spring. In the solution in which the displacement is generated through linear motion, the energy storage member 32 is a compressed spring. In this embodiment, the solution in which the displacement is generated through rotation is adopted. Compared with the solution in which the displacement is generated through linear motion, the solution in which the displacement is generated through rotation can make a structure of the thermal tripping mechanism 3 more compact and a required volume smaller.

Specifically, the movable bracket 310 and the fixed bracket 300 constitute a structure similar to a stator and a rotor. The fixed bracket 300 is provided with a roughly cylindrical cavity for placing the movable bracket 310, and a rotating shaft 302 located in a center of the cavity. The movable bracket 310 is pivoted on the fixed bracket 300 through the rotating shaft 302, and has a roughly cylindrical outer peripheral wall. The n fixed electrodes 301 on the fixed bracket 300 are sequentially fixed on an inner peripheral wall of the cavity, and the n movable electrodes 311 on the movable bracket 310 are sequentially fixed on the outer peripheral wall of the movable bracket 310.

A center of the torsional spring as the energy storage member 32 is sleeved on the rotating shaft 302. In addition, one foot of the torsional spring is fixed on a detent of the fixed bracket 300 and the other foot is fixed on a detent of the movable bracket. The twisting force of the fixed torsional spring can push the movable assembly 31 to rotate towards a direction through the rotating shaft 302 as a center of a circle (in this embodiment, a clockwise direction is taken as an example).

The metal trigger sheet 330 in this embodiment has a roughly L-shaped structure. One end of the metal trigger sheet 330 is fixed on the movable bracket 310, and the other end extends to the outside of the movable bracket 310 and is fixed with the second electrode 22 through welding, to limit rotation of the movable assembly 31.

Preferably, the movable bracket 310 is provided with a limit clamping point that has a matching setting on the fixed bracket 300, and the limit clamping point can limit a rotation angle and direction of the movable assembly 31 relative to the fixed assembly 30. For example, the limit clamping point in this embodiment is disposed on a protrusion portion 312 on the outer peripheral wall of the movable bracket 310, and the inner wall of the cavity of the fixed bracket 300 is provided with an avoidance slot 303 that matches the protrusion portion 312 and corresponds to the rotation angle of the movable assembly. The protrusion portion 312 can only move in the avoidance slot 303. In this way, when the metal trigger sheet 330 trips, the protrusion portion 312 can limit the rotation angle of the movable bracket 310, such that the gap on the movable bracket 310 is exactly located at the position at which the two adjacent fixed electrodes 301 corresponding to the two adjacent movable electrodes are disconnected from each other, to ensure the safety of a circuit port.

In addition, considering a cost and conductivity, each electrode in this embodiment is preferably made of copper or a copper alloy, and a copper electrode is used as an example to describe the electrodes in this embodiment. The housing 1, the insulating cover 23, the fixed bracket 300, and the movable bracket 310 are preferably made of materials with high flame resistance and high temperature resistance, and more preferably, are made of special engineering plastics such as polyphenylene sulfide (PPS), polyimide (PI), polyetheretherketone (PEEK), and polysulfone (PSF). In this way, they not only have high flame resistance and high temperature resistance, but also have advantages of high strength, earthquake resistance, and drop resistance, to ensure safety and durability of the surge protector.

In a preferred implementation of this embodiment, as shown in FIG. 1 to FIG. 10, the first electrode 21 and the second electrode 22 of the voltage limiting device 2 are respectively provided with a first electrode lead-out portion 210 and a second electrode lead-out portion 220 that extend to the outside of the insulating cover 23. The first fixed electrode 301 and the $n^{th}$ fixed electrode 301 on the fixed assembly 30 are provided with fixed electrode lead-out portions 301a and 301b respectively. The first electrode lead-out portion 210 is disposed tightly adjacent to one lead-out electrode 10a, the second electrode lead-out portion 220 is disposed tightly adjacent to the fixed electrode lead-out portion 301a, and the fixed electrode lead-out portion 301b is disposed tightly adjacent to another lead-out electrode 10b, so as to facilitate electrical connection between these electrodes. Such a setting herein means that two elements abut one another or two elements with a small spacing can be directly fixed through welding.

Embodiment 2

Figure 13:
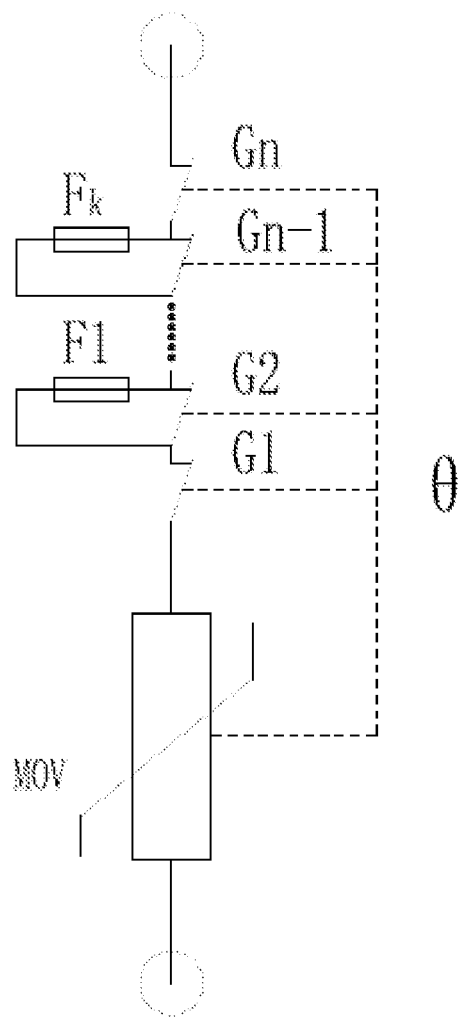
FIG. 13 schematically shows a circuit principle before thermal tripping of a surge protection device in Embodiment 2.
Figure 14:
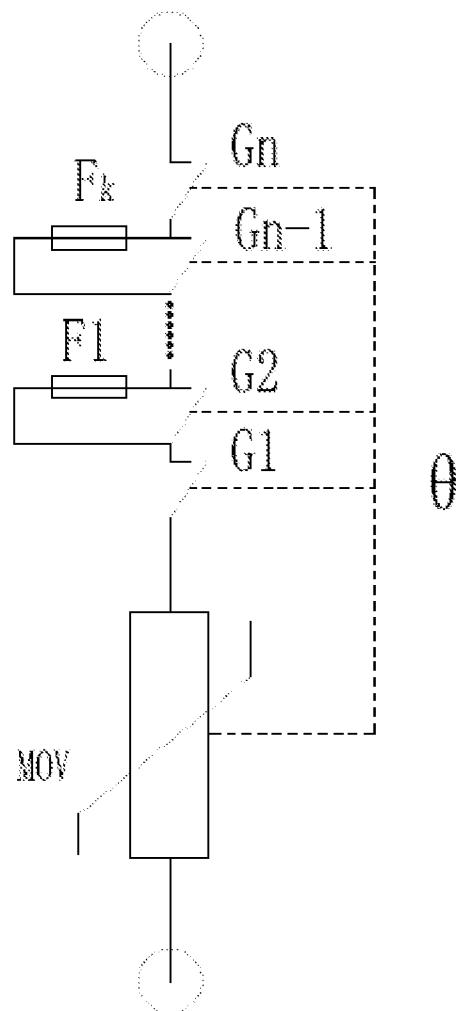
FIG. 14 schematically shows a circuit principle during thermal tripping of a surge protection device in Embodiment 2.
Figure 15:
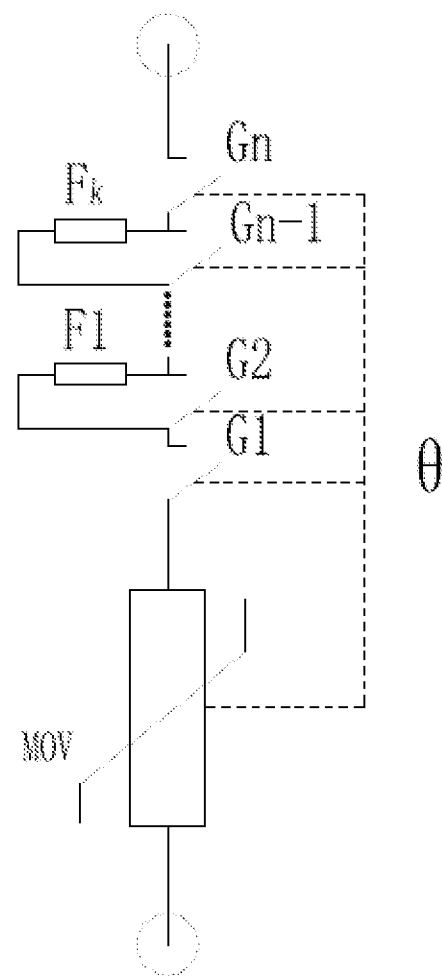
FIG. 15 schematically shows a circuit principle after thermal tripping of a surge protection device in Embodiment 2.

This embodiment also provides a surge protection device with a high breaking capacity. The surge protection device has a basically same structure as the surge protection device in Embodiment 1, and a difference between the two surge protection devices is that their application protection modes are different, as shown in FIG. 13 to FIG. 15. The surge protection device in this embodiment is provided with a current fuse connected in parallel to each of k gaps of n (n≥2) gaps connected in series, where k≤n. Circuit principles of the surge protection device are shown in FIG. 13 to FIG. 15. FIG. 13 shows a circuit principle before thermal tripping. FIG. 14 shows a circuit principle during thermal tripping. FIG. 15 shows a circuit principle after thermal tripping. The voltage limiter 20 in this embodiment is the same as that in Embodiment 1, and description is also provided through an example in which the voltage limiter 20 is a voltage-dependent resistor.

The surge protection device uses the current fuse for current shunting, to extinguish the arc at the gap first. Then fusing of the fuse is a breaking process. The fuse has a higher current breaking capacity than a single gap, thereby further improving a breaking capacity of the surge protection device.

Figure 16:
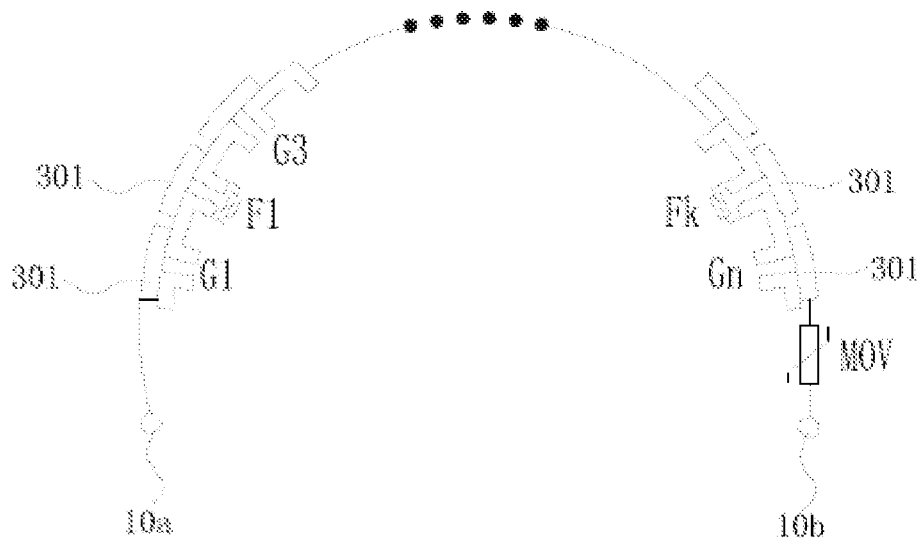
FIG. 16 schematically shows an assembly relationship between electrode pins in a surge protection device in Embodiment 2.
Figure 17:
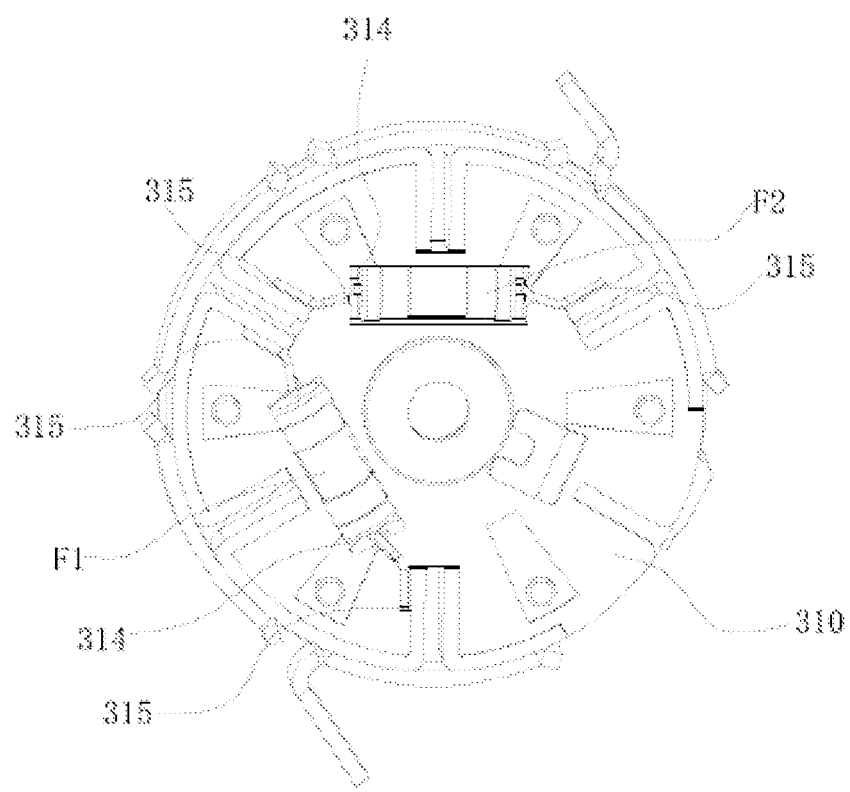
FIG. 17 is a schematic diagram of a movable bracket provided with a current fuse in Embodiment 2.

Preferably, as shown in FIG. 16, k current fuses Fk are disposed in parallel to the movable electrodes 311 on both sides of each even-numbered gap (G2, G4, G6 . . . ). Specifically, as shown in FIG. 17, the movable bracket 310 is provided with a plurality of fixing slots 314 for placing the current fuse. In this embodiment, description is provided through an example in which two current fuses F1 and F2 are installed on the movable bracket 310. The current fuse Fk can be placed in a corresponding fixing slot 314, and each fixing slot 314 is connected to two opposite latching slots 315. Two pins of the current fuse fixed in the fixing slot 314 are in conductive contact with fixed electrodes on both sides of a corresponding gap through the two latching slots 315, so as to facilitate fixing of the current fuse and conduction with the corresponding fixed electrode.

Embodiment 3

This embodiment also provides a surge protection device with a high breaking capacity. The surge protection device has a basically same structure as the surge protection device in Embodiment 1 or Embodiment 2, and a difference among the surge protection devices is that the surge protection device in this embodiment further has a remote signaling switch or a window in linkage with the movable assembly 31, to generate a failure signal.

Figure 18:
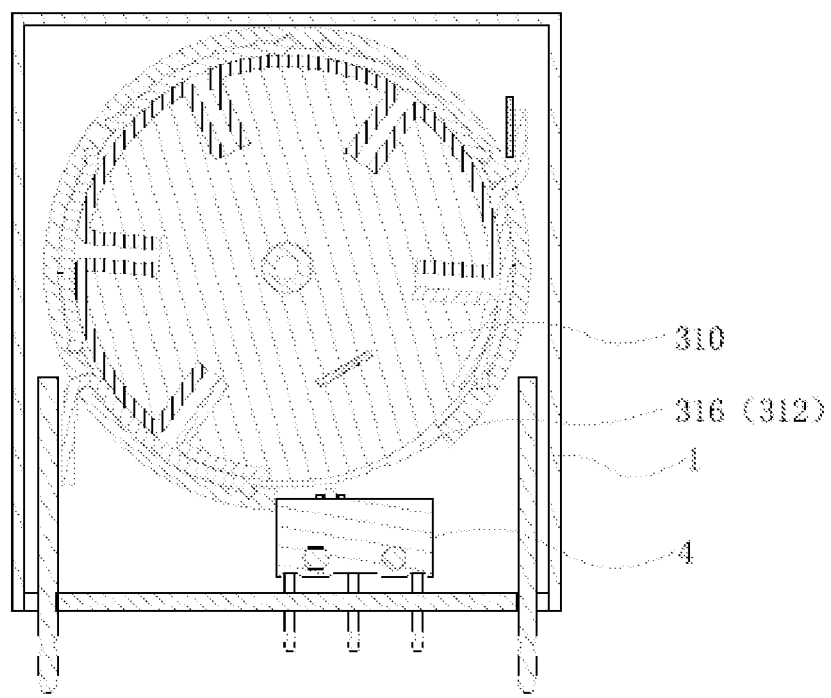
FIG. 18 schematically shows a surge protection device in Embodiment 3.
Figure 19:
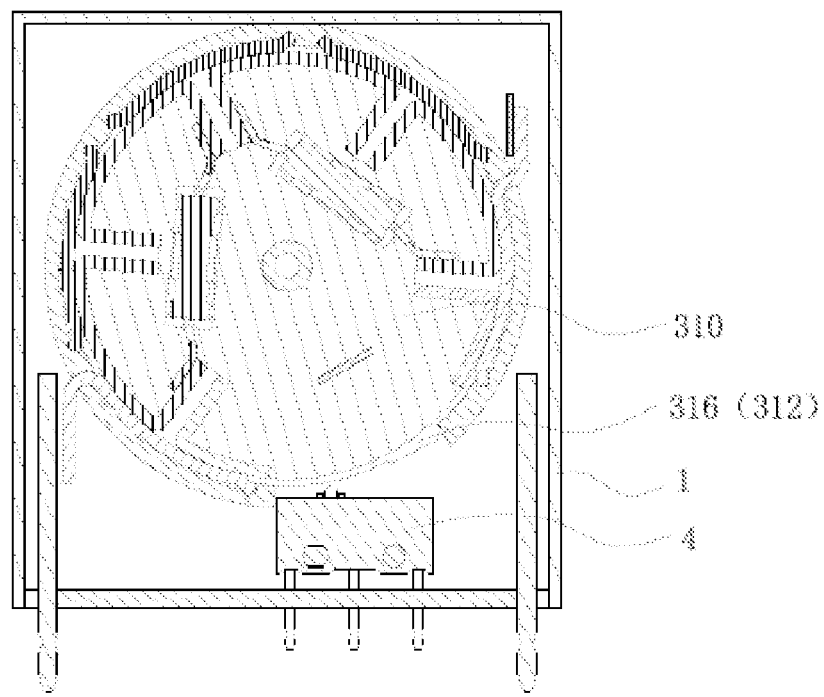
FIG. 19 schematically shows another surge protection device in Embodiment 3.

In this embodiment, description is provided through a remote signaling switch 4 as an example. As shown in FIG. 18 and FIG. 19, the remote signaling switch 4 is fixedly disposed in the housing 1, and a pin of the remote signaling switch 4 extends to the inside of the housing 1. The movable bracket 310 is provided with a remote signaling trigger portion 316 that rotates synchronously with the movable bracket 310 to trigger the remote signaling switch 4. When thermal tripping occurs on the metal trigger sheet 330 to cause the movable bracket 310 to rotate, the remote signaling trigger portion 316 acts on the remote signaling switch 4 to enable the remote signaling switch 4 to trigger a failure alarm. FIG. 18 is a schematic diagram of adding a remote signaling switch to the surge protection device in Embodiment 1, and FIG. 19 is a schematic diagram of adding a remote signaling switch to the surge protection device in Embodiment 2.

In a preferred implementation of this embodiment, the remote signaling trigger portion 316 is the protrusion portion 312 in Embodiment 1, in other words, the protrusion portion 312 is used not only as a component to limit the rotation angle of the movable bracket 310, but also as the remote signaling trigger portion 316 to trigger the remote signaling switch 4. In this way, there is no need to add a corresponding structure or functional part on the movable bracket 310, making a structure of the movable bracket 310 simpler and more compact.

Embodiment 4

Figure 20:
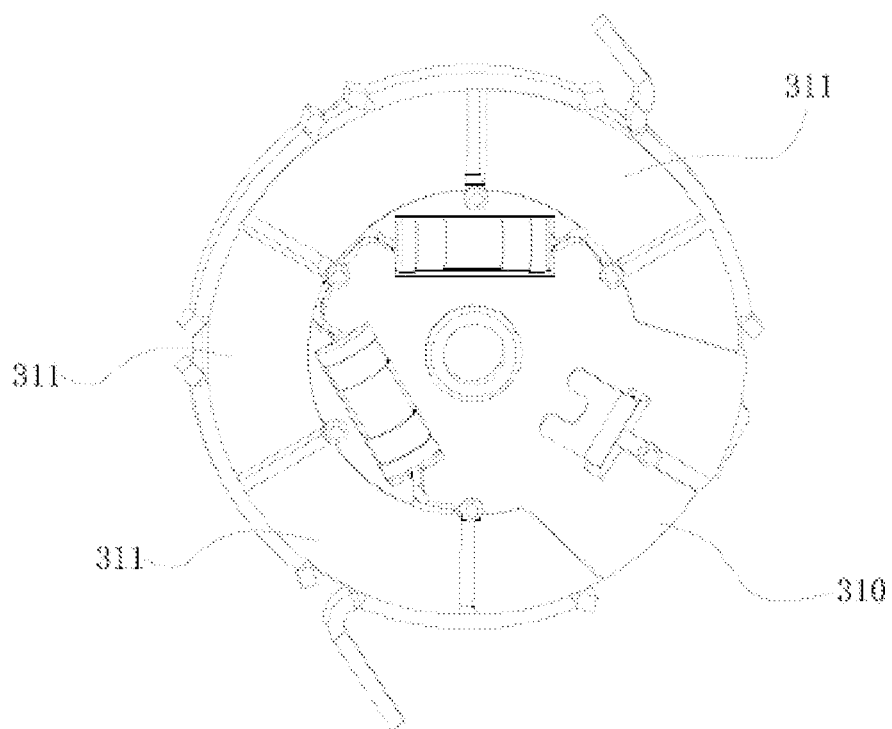
FIG. 20 schematically shows a movable bracket of a surge protection device in Embodiment 4.

This embodiment also provides a surge protection device with a high breaking capacity. The surge protection device has a basically same structure as the surge protection device in Embodiment 1 or Embodiment 2, and a difference among the surge protection devices is that the movable electrode 311 in Embodiment 1 or Embodiment 2 is made of copper or a copper alloy, and the movable electrode 311 in this embodiment is made of graphite, as shown in FIG. 20. The movable electrode 311 of a corresponding material may be selected based on a protection mode.

Although the present invention is specifically illustrated and described in combination with preferred implementation solutions, those skilled in the art should understand that various changes may be made to the present invention in terms of forms and details without departing from the spirit and scope of the present invention defined in the appended claims, which shall fall within the protection scope of the present invention.

The term "one embodiment", "embodiment" or "one or more embodiments" mentioned herein means that a specific feature, structure, or characteristic described in combination with the embodiment is included at least one embodiment of the present invention. In addition, it should be noted that the phrase example "in an embodiment" herein does not necessarily refer to the same embodiment.

In the specification provided herein, lots of specific details are described. However, it can be understood that the embodiments of the present invention can be practiced without the specific details. In some embodiments, well-known methods, structures and techniques are not shown in detail to avoid obscuring the understanding of this specification.

What is claimed is:

1. A surge protection device with a high breaking capacity, comprising a housing with at least two lead-out electrodes, a voltage limiting device and a thermal tripping mechanism, wherein the voltage limiting device and the thermal tripping mechanism are installed in the housing, wherein
   the voltage limiting device comprises a voltage limiter, a first electrode and a second electrode, wherein the voltage limiter, the first electrode and the second electrode are positioned and installed in an insulating cover;
   the thermal tripping mechanism comprises a fixed assembly, a movable assembly and a thermal trigger device, wherein
      the fixed assembly and the movable assembly form a plurality of displacement switches arranged in series;
      the thermal trigger device is disposed in linkage with the movable assembly, and the thermal trigger device comprises a metal trigger sheet, a fusible alloy and an energy storage member;
   a first end of the metal trigger sheet is fixed on the movable assembly, and a second end of the metal trigger sheet is fixed on the second electrode through welding by the fusible alloy, wherein a displacement of the movable assembly relative to the fixed assembly is limited, and the energy storage member accumulates potential energy to displace the movable assembly relative to the fixed assembly; and
   the first electrode is electrically connected to one lead-out electrode of the at least two lead-out electrodes, and both ends of the plurality of displacement switches arranged in series are electrically connected to the second electrode and another lead-out electrode of the at least two lead-out electrodes, respectively.

2. The surge protection device according to claim 1, wherein
   the fixed assembly comprises a fixed bracket and n fixed electrodes sequentially fixed on the fixed bracket, n≥2, and the n fixed electrodes are disconnected from each other;
   the movable assembly comprises a movable bracket and n+1 movable electrodes sequentially fixed on the movable bracket;
   a gap is formed between two adjacent movable electrodes;

the movable bracket has a first state and a second state, wherein the movable bracket in the first state has no displacement relative to the fixed bracket, and the movable bracket in the second state has a displacement relative to the fixed bracket;

wherein in the first state, each fixed electrode of the n fixed electrodes is in contact with two adjacent movable electrodes corresponding to each fixed electrode to allow the n fixed electrodes to be in a conducting state; and in the second state, the gap formed between the two adjacent movable electrodes is exactly located at a position, wherein two adjacent fixed electrodes corresponding to the two adjacent movable electrodes are disconnected from each other at the position, wherein the n fixed electrodes are disconnected from each other and in a non-conducting state.

3. The surge protection device according to claim 2, wherein
limit structures matched with each other are respectively disposed on the movable bracket and the fixed bracket, and the limit structures limit a displacement distance or an angle of the movable bracket relative to the fixed bracket.

4. The surge protection device according to claim 3, wherein
the limit structures are a protrusion portion disposed on the movable bracket and an avoidance slot disposed on the fixed bracket.

5. The surge protection device according to claim 2, wherein
an interval between gaps is greater than or equal to 0.1 mm.

6. The surge protection device according to claim 5, wherein
the interval between the gaps is 0.6 mm to 1.5 mm.

7. The surge protection device according to claim 2, wherein
the fixed bracket is provided with a roughly cylindrical cavity, and a center of the roughly cylindrical cavity is provided with a rotating shaft;
the movable bracket is pivoted on the fixed bracket through the rotating shaft, and the movable bracket has an outer peripheral wall corresponding to an inner wall of the roughly cylindrical cavity; and
the n fixed electrodes are fixed on the inner wall of the roughly cylindrical cavity, and the n+1 movable electrodes are fixed on the outer peripheral wall of the movable bracket.

8. The surge protection device according to claim 7, wherein
the first electrode and the second electrode of the voltage limiting device are respectively provided with a first electrode lead-out portion and a second electrode lead-out portion, wherein the first electrode lead-out portion and the second electrode lead-out portion extend to an outside of the insulating cover;
each of a first fixed electrode and an $n^{th}$ fixed electrode on the fixed assembly is provided with a fixed electrode lead-out portion;
the first electrode lead-out portion is disposed tightly adjacent to one lead-out electrode, the second electrode lead-out portion is disposed tightly adjacent to one fixed electrode lead-out portion, and another fixed electrode lead-out portion is disposed tightly adjacent to another lead-out electrode.

9. The surge protection device according to claim 2, wherein
the surge protection device is provided with a current fuse, wherein the current fuse is connected in parallel to each of k gaps of n gaps connected in series, wherein $k \leq n$.

10. The surge protection device according to claim 9, wherein
movable electrodes on both sides of each even-numbered gap are connected to the current fuse in parallel.

11. The surge protection device according to claim 9, wherein
the movable bracket is provided with a plurality of fixing slots for placing the current fuse; and each fixing slot of the plurality of fixing slots is connected to two opposite latching slots, and
two pins of the current fuse fixed in each fixing slot are in conductive contact with fixed electrodes on both sides of a corresponding gap through the two opposite latching slots.

12. The surge protection device according to claim 2, further comprising a remote signaling switch or a window, wherein the remote signaling switch or the window is in linkage with the movable assembly.

13. The surge protection device according to claim 1, wherein
the movable assembly rotates relative to the fixed assembly to realize the displacement.

* * * * *